US010649658B2

(12) United States Patent
Georgiev et al.

(10) Patent No.: US 10,649,658 B2
(45) Date of Patent: May 12, 2020

(54) FILE SYSTEM BASED KEY VALUE SERVICE

(71) Applicant: VMware, Inc., Palo Alto, CA (US)

(72) Inventors: George Georgiev, Castro Valley, CA (US); Rohit Jog, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 504 days.

(21) Appl. No.: 14/986,254

(22) Filed: Dec. 31, 2015

(65) Prior Publication Data
US 2017/0192989 A1 Jul. 6, 2017

(51) Int. Cl.
G06F 3/06 (2006.01)
G06F 9/46 (2006.01)

(52) U.S. Cl.
CPC .......... G06F 3/0605 (2013.01); G06F 3/067 (2013.01); G06F 3/0643 (2013.01); G06F 3/0667 (2013.01)

(58) Field of Classification Search
CPC ......... G06F 17/30094; G06F 17/30097; G06F 17/30106; G06F 17/30132; G06F 17/30551
USPC ....................................................... 707/746
See application file for complete search history.

(56) References Cited

U.S. PATENT DOCUMENTS

| 8,341,115 | B1* | 12/2012 | Natanzon | G06F 11/2071 707/613 |
| 9,158,632 | B1* | 10/2015 | Xing | G06F 11/1438 |
| 9,225,529 | B1* | 12/2015 | Natanzon | H04L 63/0428 |
| 2012/0185437 | A1* | 7/2012 | Pavlov | G06F 17/30094 707/652 |
| 2012/0221576 | A1* | 8/2012 | Marquardt | G06F 17/30144 707/741 |
| 2012/0310882 | A1* | 12/2012 | Werner | H04L 67/1095 707/624 |
| 2014/0033019 | A1* | 1/2014 | Zhang | G06F 17/2247 715/234 |
| 2014/0236892 | A1* | 8/2014 | Blyler | G06F 11/1451 707/625 |
| 2014/0344391 | A1* | 11/2014 | Varney | H04L 41/50 709/213 |

* cited by examiner

Primary Examiner — Syed H Hasan
Assistant Examiner — Nicholas E Allen

(57) ABSTRACT

Embodiments perform distributed management of an inventory of a shared, distributed storage device. Host computing devices accessing the storage device maintain, on the storage device, journaling files of the storage events performed by each of the host computing devices. A tidy file is maintained, on the storage device, by all of the host computing devices, reflecting the storage events performed by each of the host computing devices.

20 Claims, 10 Drawing Sheets

FILE SYSTEM BASED KEY VALUE SERVICE

BACKGROUND

Some existing systems attempt to manage the inventory of storage devices accessed by virtual machines (VMs), containers, and other cloud-native applications. For instance, these systems name a disk on a storage device by its relationship to a reference such as a VM, instead of giving the storage device a unique identifier. This results in a storage device identity which is not persistent, but rather changes throughout the lifecycle of the storage device, and requires changes to paths as the reference (in this example, the VM) associated with the disk changes. As such, the existing systems for managing data storage devices through references such as VMs, containers, or other cloud-native applications are not as compatible with data-centric processing and applications, which concern the acquisition, processing, analysis, storage and query of large data sets.

Although some existing solutions exist for managing storage devices, these solutions are centralized, and often cumbersome and transitory. Some of the existing systems require networking management with their own concepts of clusters. Using such solutions creates requirements for the host administrators to also maintain configurations for them. This imposes a higher burden for the administrator, as well as a higher cost in resource use.

SUMMARY

Embodiments described herein enable the creation and maintenance of a distributed inventory of objects used by a plurality of host computing devices. Each of the plurality of the host computing devices record various events on the objects in the inventory. Each host computing device writes its events to one or more journaling files, maintained on the storage device. A pseudo timestamp (PTS) is attached to each event. Periodically the plurality of journaling files are read into memory by the host computing devices, where a randomly selected host is appointed to create or to write in a tidy file, which reflects the data up to a certain PTS. When a new generation tidy file is reviewed, this is reflected with a new PTS. The tidy file, also stored on the storage device, accumulates the state of an item up to a certain PTS, based on evaluating the events that are tracked with the journaling files created by the host computing devices up to the PTS.

One randomly selected host computing device creates anew version of the tidy file, at specific newer PTS, by combining the data from the current active tidy file and the accumulated events in the journaling files between the previous and the new PTS. When all host computing devices have concluded using the current tidy file, they are migrated one by one to the new tidy file.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Embodiments of the disclosed system enable a plurality of host computing devices to manage an inventory of a shared, storage device in a distributed manner. In some examples, the storage device is a virtualized system; however, alternative examples are contemplated. The system, in some examples, utilizes a service executing on each host computing device to create, manage, and update journaling and tidy files stored on the storage device. The journaling and tidy files, stored on the storage device, are readable by each of the host computing devices. By using a pseudo timestamp (PTS), the host computing devices ascertain which files, and which storage events recorded in the files, are most recent, without communicating with the other host computing devices in the system. In this way, the host computing devices manage the inventory of storage devices in a distributed manner.

Because the disclosed system relies on files or other data structures maintained on the storage device, such as a POSIX (portable operating system interface) file, elements of the system are supported on every storage device that provides access through a POSIX API. Updates are maintained in the journaling and tidy files located on the storage device, which are accessible by all the host computing devices. Tracking the storage events on the storage device itself provides a consistent record, and reduces the subsystem resources involved for providing the service, which increases the availability of the system resources. Additionally, synchronization errors are reduced, as the storage events are handled in a distributed fashion, yet recorded on the storage device. The disclosed system improves storage synchronicity and accessibility.

Figure 1A:
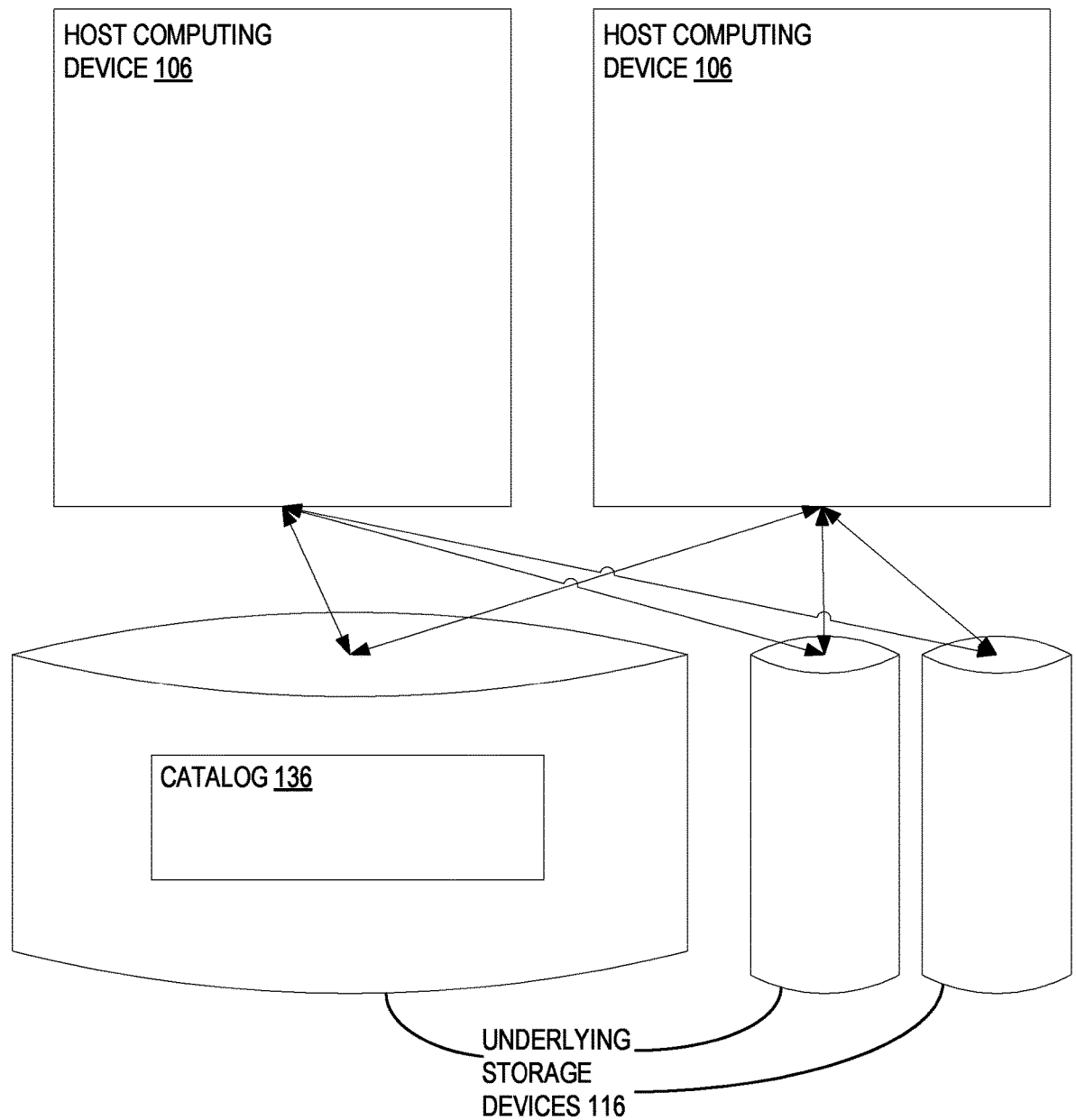
FIG. 1A is a block diagram of an exemplary computing device for implementing the distributed management of an inventory of a shared objects by a plurality of host computing devices using a device catalog located on the storage device.

FIG. 1A is a block diagram of an exemplary computing device for implementing the distributed management of an inventory of a shared objects by a plurality of host computing devices using a device catalog located on the storage device. The system disclosed in FIG. 1A is described in more detail in FIG. 1B and the accompanying text. FIG. 1A illustrates the catalog 136, located on the underlying storage device 116, which is accessible by all host computing devices 106. The shared catalog 136 permits events, which occur on or to an object and which are controlled by any host computing device 106, to be seen by all host computing devices 106.

Figure 1B:
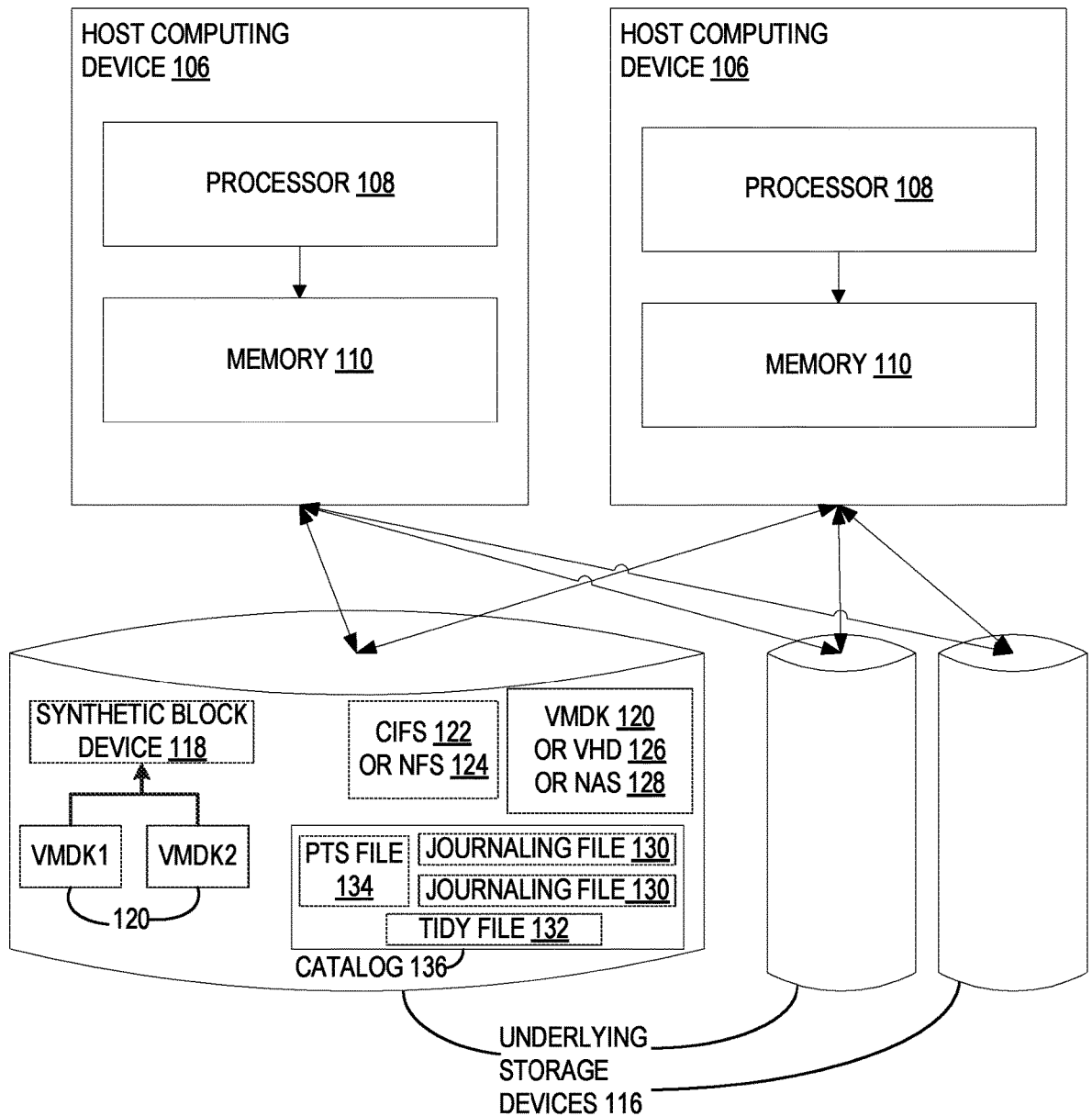
FIG. 1B is a block diagram of an exemplary computing device for implementing the distributed management of an inventory of a shared objects by a plurality of host computing devices using journaling and tidy files in a catalog located on the storage device.

FIG. 1B is a block diagram of an exemplary computing device for implementing the distributed management of an inventory of a shared, virtualized storage device by a plurality of host computing devices using journaling and tidy files located on the storage device. In the example of FIG. 1, host computing devices 106 include a processor 108 and memory 110. The host computing devices 106 share access to multiple underlying storage devices 116. The host computing device 106 is illustrated and described in more detail in FIGS. 7 and 8, and the associated detailed description.

The underlying storage devices 116, in some examples as illustrated in FIG. 1B, includes a synthetic block device 118, such as a virtual machine disk (VMDK) 120, a common internet file system (CIFS) 122, a network file system (NFS) 124, virtual hard drive (VHD) 126, or network-attached storage (NAS) 128.

Also located on the storage device 116 is the catalog 136. In this example, the catalog 136 includes a plurality of journaling files 130, and at least one tidy file 132. In some examples, the journaling files 130 are each associated with only one host computing device 106, although the host computing device 106 is able to be associated with more than one journaling file 130. In some examples, the host computing device 106 can randomly pick journaling file 130 and lock it to record the event. The journaling files 130 and the tidy file 132 are accessible for reading by any of the host computing devices 106. In some examples, the journaling files 130 and the tidy file 132 are located in the same directory of the storage device 116. The journaling files 130, while stored on the storage device 116, are also cached in some examples in memory 110 on one or more of the host computing devices 106 to reduce the number of reads required by the host computing devices 106 from the tidy file 132. The tidy file 132 is maintained in a shared read status, allowing all host computing devices to access the tidy file 132 simultaneously.

The storage device 116 also, in some examples, contains the PTS file 134. The PTS is a virtual clock, epoch, or generation identifier (ID) assigned to each storage event. PTS may be used, instead of host time, because individual host computing devices 106 do not necessarily have the same or correct time. PTS is enabled by storing a data structure, such as a file (e.g., the PTS file 134) on the storage device 116. The PTS file 134 is named after an integer number (e.g., PTS005) in some examples. When a host computing device 106 needs the next PTS, it obtains the current name of the PTS file 134 and attempts to rename the PTS file 134. If the host computing device 106 successfully renames the PTS file 134, then the host computing device 106 is the new owner of that PTS. However, if the attempt fails, then another host computing device 106 is probably using the PTS file 134. After a host computing device 106 updates and closes the PTS file 134 (e.g. changing the PTS file 134 from PTS005 to PTS006), the next host computing device 106 accesses and updates the PTS file 134. Thus the PTS is not a linear clock-based timeline, in some examples, but rather a sequential, integer-based timeline of events, in this example.

Figure 2:
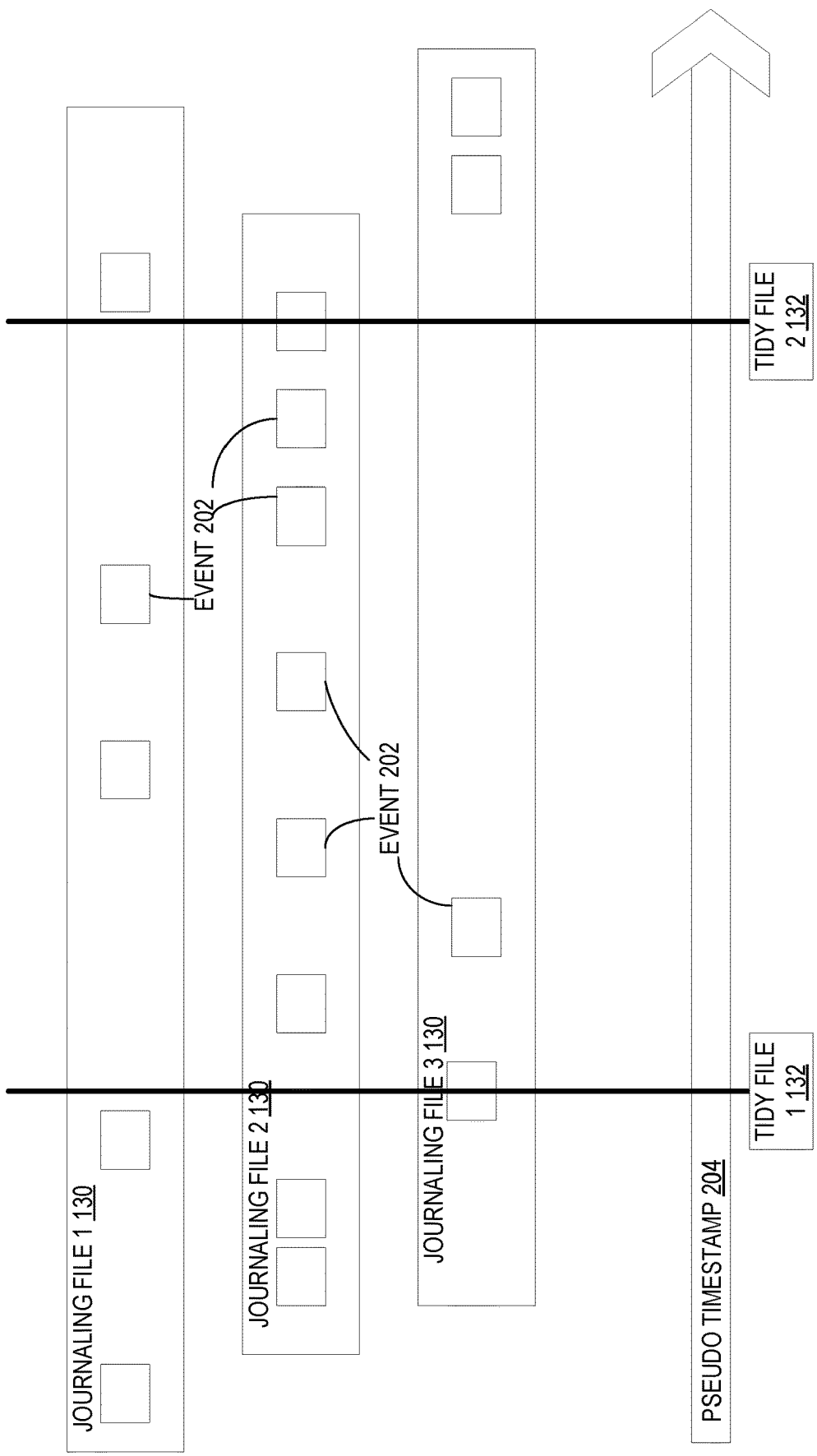
FIG. 2 is a block diagram of the events comprising the creation of the journaling files, and the creation of the tidy files over time.

FIG. 2 is a block diagram of the events comprising the creation of the journaling files, and the creation of the tidy files over time. FIG. 2 illustrates three journaling files 130, and the creation of two tidy files 132 on the pseudo timestamp (PTS) timeline.

Each journaling file 130 shows several events 202. An event 202 is any operation performed upon the storage device 116. As an example, events 202 include the following non-exhaustive set of operations: register, unregister, remove disk, relocate, rename, extend, clone, reset, erase, add, update, patch, moveout, remove, get, has, list, and/or delta. The events 202 are recorded as full records, in some examples, and not just the delta of the storage device after the event 202. Each event 202 recorded on the journaling files is stored under its corresponding PTS. In some examples, each event 202 is discrete and non-overlapping. If all the journaling files 130 are taken or locked, anew journaling file 130 is created. The creation of the journaling files 130 is described in more detail in FIG. 4. In some examples, the journaling files 130 are referred to as shards.

Figure 5:
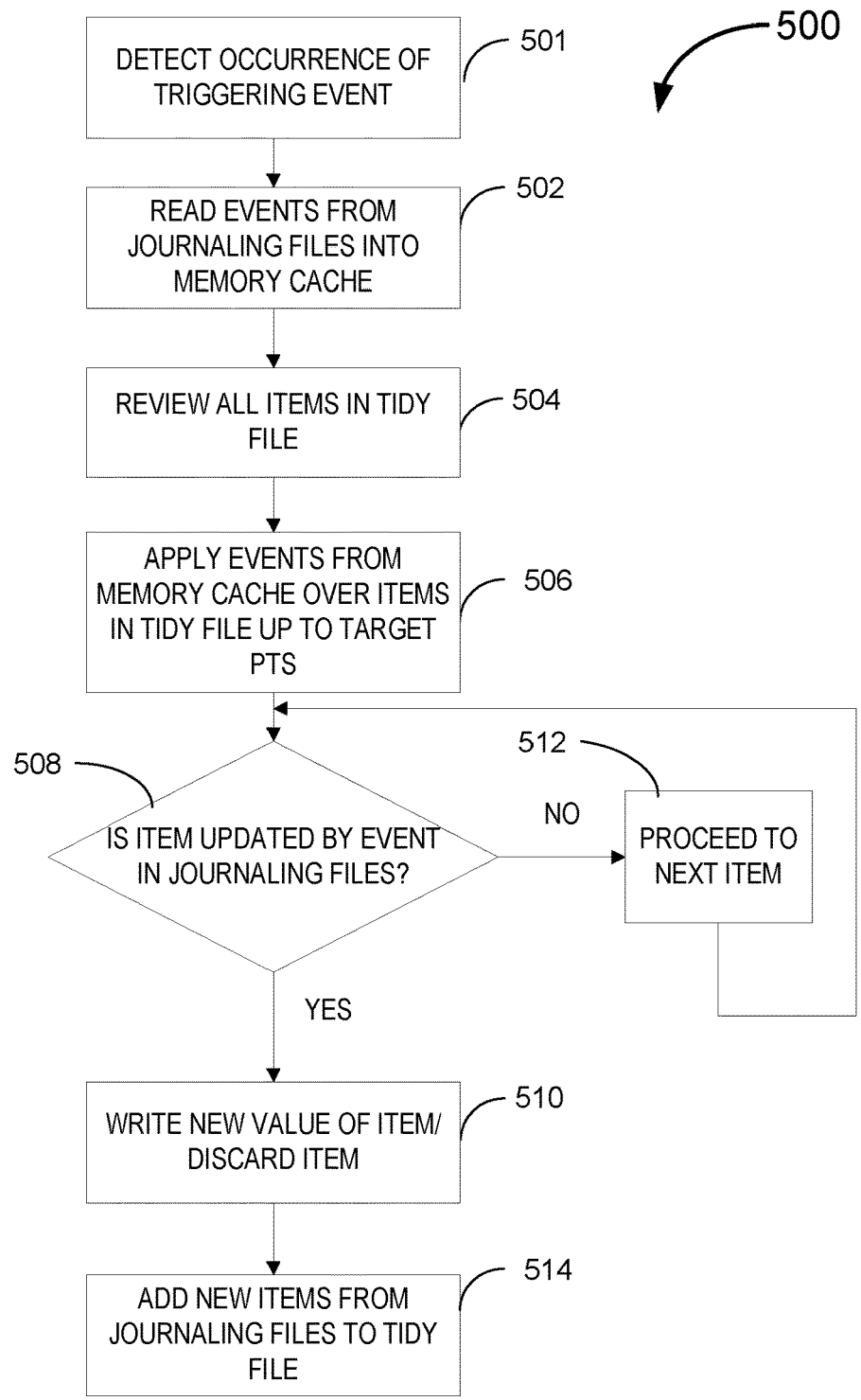
FIG. 5 is a flowchart of another exemplary method performed by the host computing device to manage the distributed inventory of the shared, virtualized storage device by updating a tidy file with journaling file entries.
Figure 8:
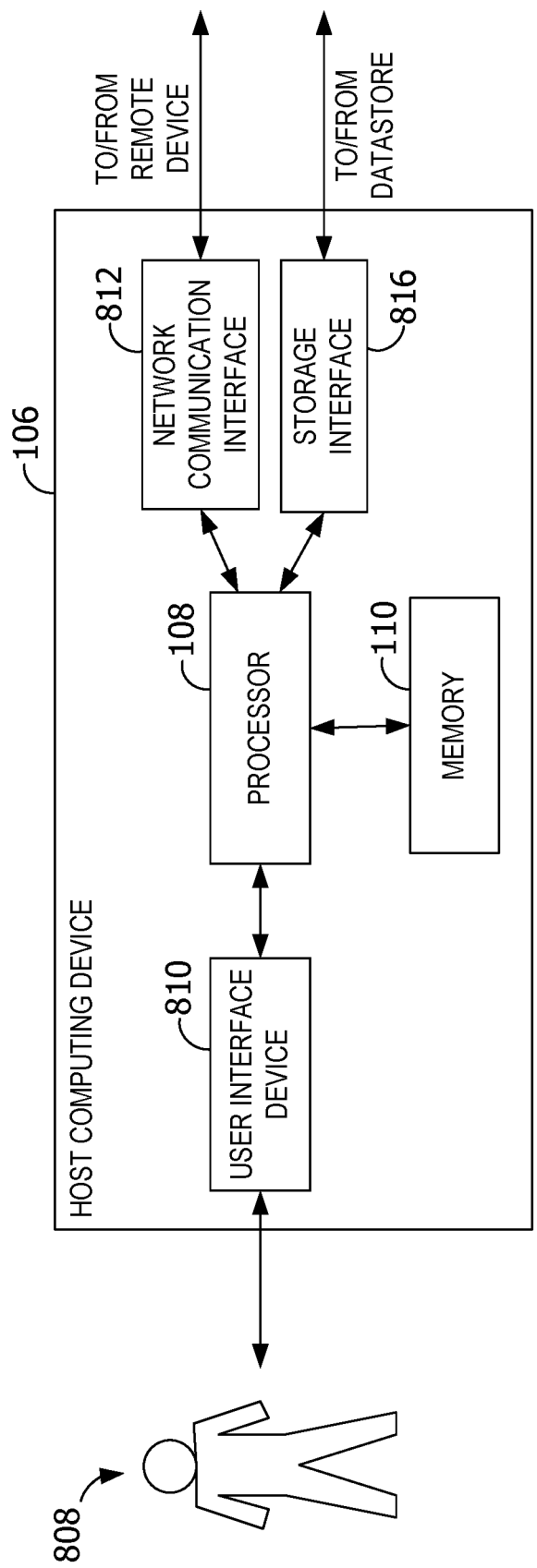
FIG. 8 is a block diagram of an exemplary host computing device.

As the time progresses under the PTS timeline, tidy file 1 132 is created first. Tidy file 1 132 is created to reflect a summary of all events 202 occurring on journaling file 3 130. In the illustrated example, tidy file 2 is 132 is created as the last event 202 occurs on journaling file 2 130. The operations in the creation of the tidy file 132 are illustrated in more detail in FIG. 5, and FIG. 8 illustrates the sequence of events between the host computing devices 106 and the storage device 116 as journaling files 130 are updated and tidy files 132 are created.

In some examples, multiple host computing devices 106 create different versions of tidy files 132. For example, one host computing device operates an older or different version of the service creating the tidy files 132. In this example, tidy files 132 are not discarded once a new tidy file 132 is created, because the older tidy files 132 are still used by some of the host computing devices 106. In this example, there is at least one tidy file 132 maintained for each version of the service operated by the host computing devices 106.

Figure 3:
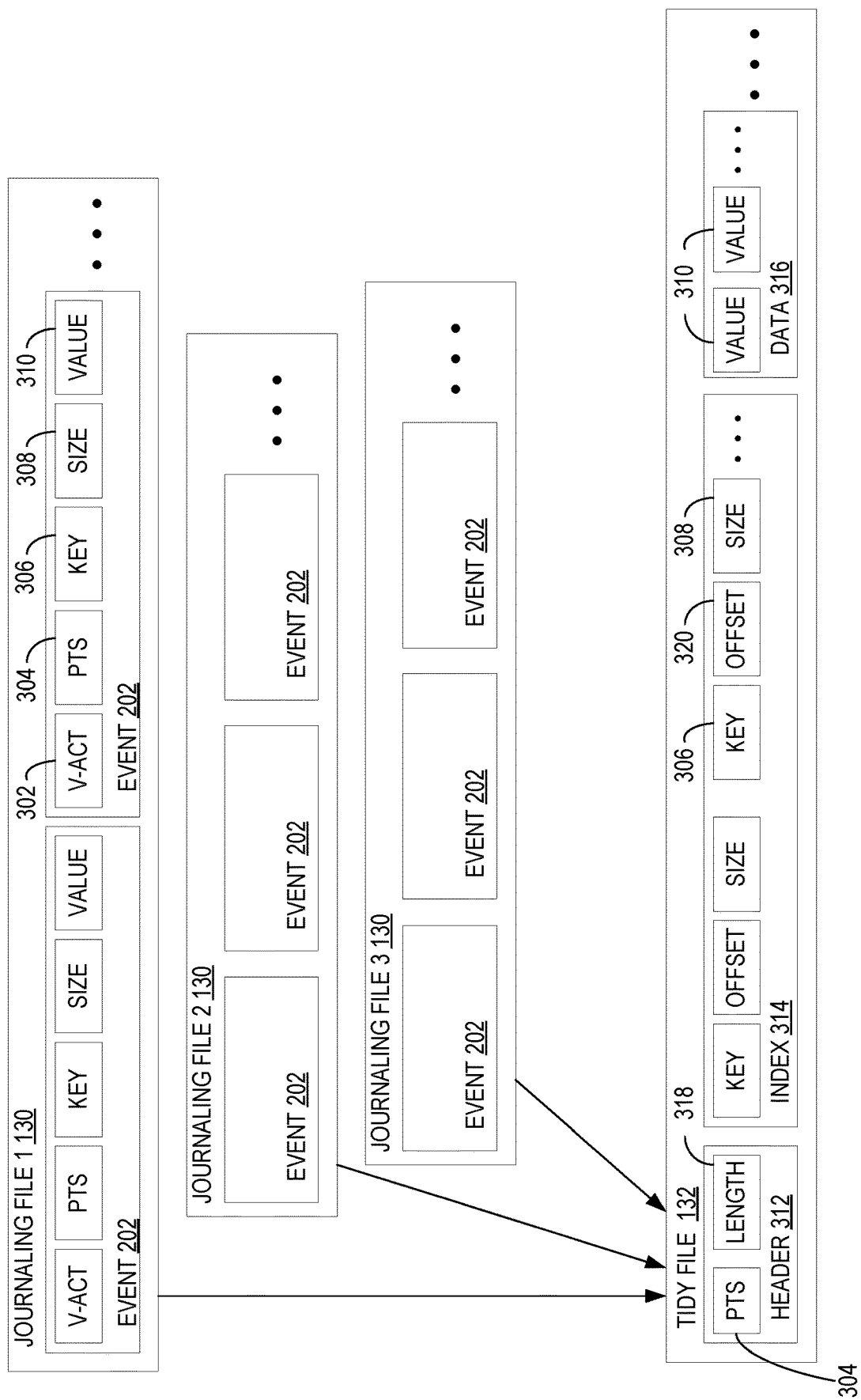
FIG. 3 is a block diagram of the contents of several journaling files which are read into a single tidy file.

FIG. 3 is a block diagram of the contents of several journaling files. In some examples, the journaling files contain events per items identified by key and having a value. Journaling file 1 130 is a more detailed block diagram of the components of each event 202. Each event 202 includes data such as v-act 302, PTS 304, key 306, size 308 and value 310. The v-act 302 represents the action that was done for the item with id key. Some action like add and update include a value. Some actions, for example delete or move out, do not include a value. The PTS 304 is the pseudo timestamp when the event 202 occurred. The key 306 corresponds to an identifier, in some examples a universally unique identifier (UUID) of the storage device 116 and the value 310 is the value of the item. The size 308 is the size of the block. The size 308 is optional, and is only necessary if the value is not a fixed size for all items.

The tidy file 132 shares several features with the journaling files 130. The tidy file 132 is divided into a header 312, an index 314, and the data 316. The header 312 includes a PTS 304 indicating up to where the data in the tidy file 132 represents the state of the items, and the length 314 of the tidy file 132, or in some examples the number of items in the file 132. The index 314 includes the key 306, offset 320, and size 308. As in the journaling file 130, the key 306 corresponds to the UUID of the storage device 116. The size 308 is the size of the block. The offset 320 indicates the offset of the entry from the item value in the tidy file 132. Some or all host computing devices 106 share access to the tidy file 132. In some examples, the offset 320 is a fixed size, permitting random access to these elements to allow hash or binary search. The entries in the tidy file 132, in that example, are sorted and binary.

Figure 9:
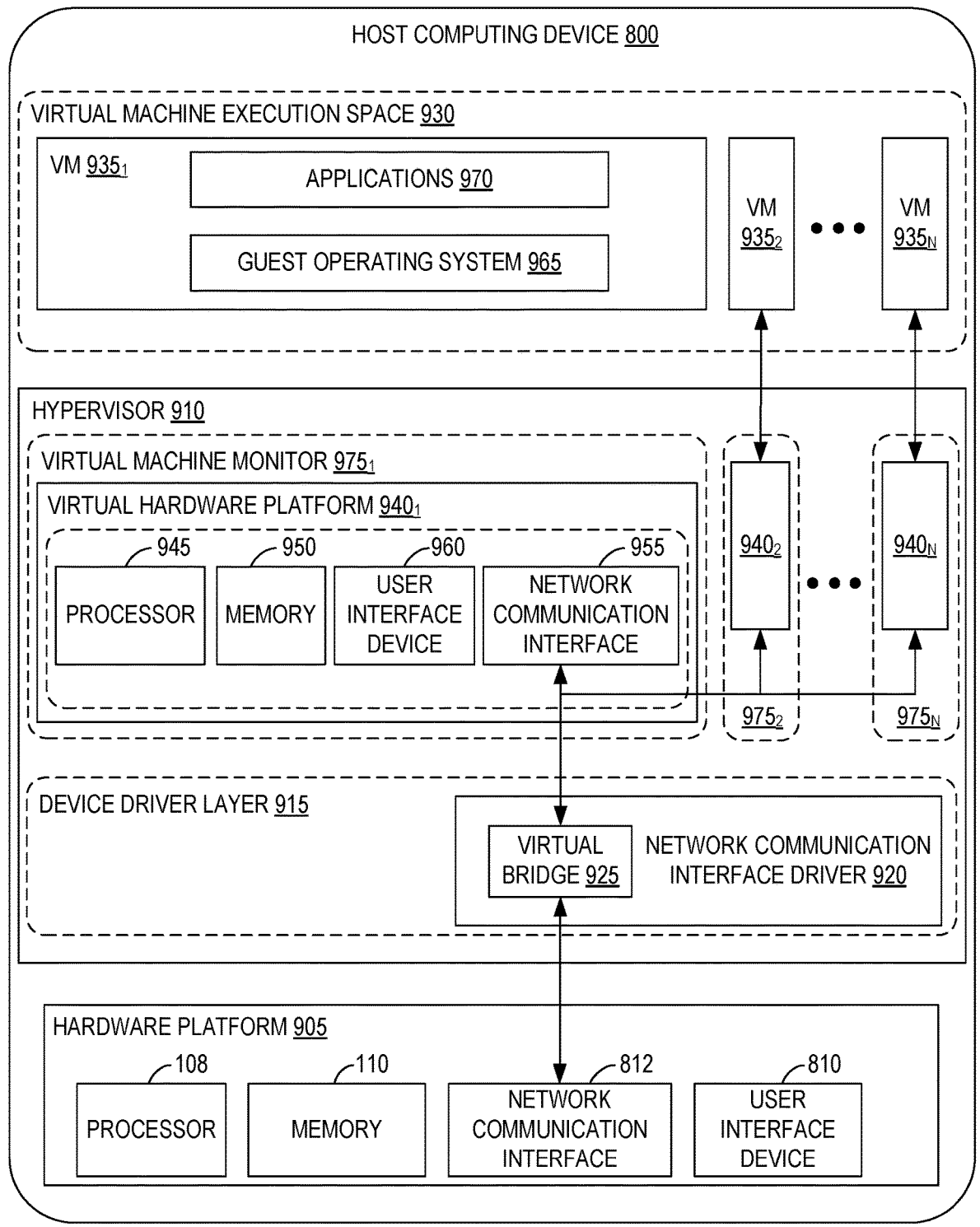
FIG. 9 is a block diagram of virtual machines that are instantiated on a computing device, such as the host computing device shown in FIG. 8.

The journaling files 130 and tidy file 132 illustrated in FIG. 3 constitute means for performing the distributed inventory management of a shared storage device, outlined in method 600. Further, the system illustrated generally in FIGS. 1A and 1B, and more specifically in FIGS. 8 and 9, are systems for executing the operations described in method 600. Other means and systems are contemplated, and the disclosed is merely one example.

Figure 4:
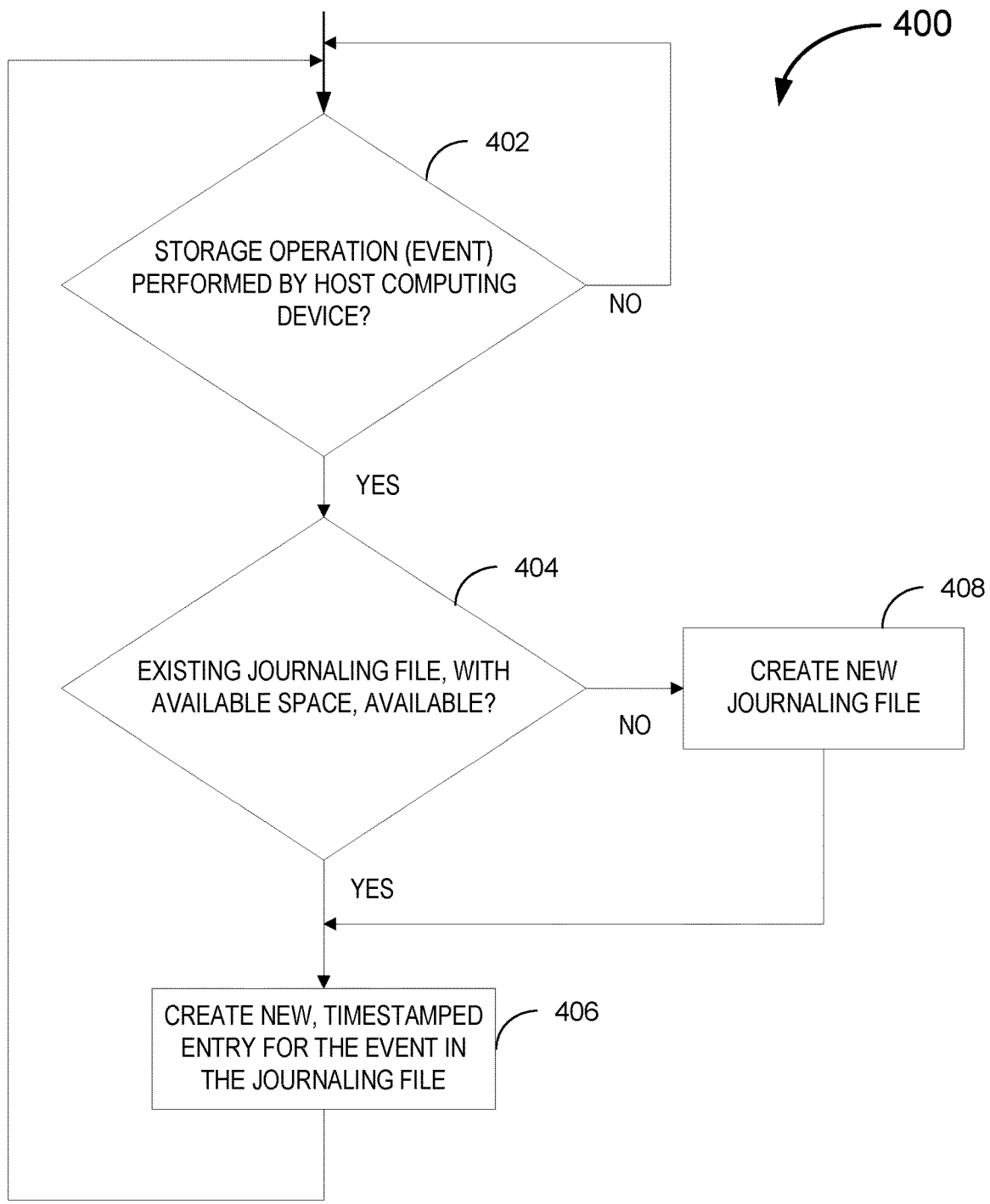
FIG. 4 is a flowchart of an exemplary method performed by a host computing device to create journaling files for use in the distributed inventory management of the shared, virtualized storage device.

FIG. 4 is a flowchart of an exemplary method performed by a host computing device to create journaling files for use in the distributed inventory management of the shared, virtualized storage device. The journaling files 130 are created and maintained by each host computing device 106, with journaling files 130 accessible from each host computing device 106. Under method 400, at 402 if a storage operation, or event 202, is performed by a host computing device 106, then the host computing device 106 checks that there is a journaling file 130 with available space to record the event 202 at 404. If there is available space on a journaling file 130, then a new entry reflecting that event 202 is created on the journaling file 130 at 406. The entry of the event 202 includes a pseudo timestamp (PTS 304).

However, if at 404 no journaling file 130 has available space, then a new journaling file 130 is created at 408. Subsequently, the storage operation event 202 is recorded upon the new journaling file at 406. The storage operation, in some examples, is the result of an action requested by a VM, such as VM 935 in FIG. 9, or any other container, or cloud-native application.

In some examples, the storage operations are performed by way of an application programming interface (API). Some examples of APIs for storage operations are "Register" (e.g., adds new entry into the key-value service), "Unregister" (e.g., removes/deletes entry from the key-value service), "AddDisk" (e.g., creates new virtual disk on the storage device and adds a new entry into the key-value service), "RemoveDisk" (e.g., delete disk from the storage device and removes entry from the key-value service), "Relocate" (e.g., adds 'MovedOut' entry on the key-value service for the source storage device and adds new entry into the key-value service for the destination storage device), "Rename" (e.g., renames actual disk on the storage device and adds "Update" entry into the key-value service), "Extend" (e.g., extends capacity of the given virtual disk on datastore and adds "Update" entry into the key-value service), "Clone" (e.g., clones a given virtual disk and adds new entry for the newly cloned virtual disk). APIs are further utilized to access the tidy file 132.

FIG. 5 is a flowchart of an exemplary method performed by the host computing device to manage the distributed inventory of the shared storage device. Under method 500 a host computing device 106 creates a tidy file 132 to manage the inventory of all the events 202 performed by all of the host computing devices 106. At 501, some triggering event occurs, to begin the process of creating or updating the tidy file 132. In some examples the triggering event is dictated by a policy. For example, a policy federated by an administrator requires that the tidy file 132 is created or written to periodically, upon certain storage events such as disk migration, at certain intervals, when requested, on demand, upon the number of journaling files 130 reaching some minimum, predefined amount, threshold amount, etc. Reading the journaling files 130 may occur intermittently, periodically, regularly, at scheduled intervals, or on any schedule or in response to any triggering event established by a policy. After a journaling file 130 is read, in some examples, the journaling file 130 is discarded.

In the example of FIG. 5, at 502 one of the host computing devices 106 reads the events 202 from the journaling files 130 into the memory cache. Each event 202 has its own PTS 304. The host computing device 106 reviews the PTS 304 of the records in the tidy file 132 at 504. In some examples, reading the PTS of the events of the events 202 of the journaling files 130 does not require opening the individual journaling files 130, but instead uses the metadata of the journaling files 130. Additionally, multi-threading is used to read the data most efficiently. At 506 events 202 from the memory cache are applied over items in the tidy file 132 up to the target PTS 304. If an item is not updated by an event 202 in the journaling files 130 at 508, then the next item is examined at 512. However, if an item is updated then the new value 310 of the item is written at 510, or in some examples, if the item is removed then the value 310 is discarded. At 514, any new items from the journaling files 130 are added to the tidy file 132.

In this manner, each of the plurality of host computing devices is able to access the shared storage device without a centralized inventory management system.

Figure 6:
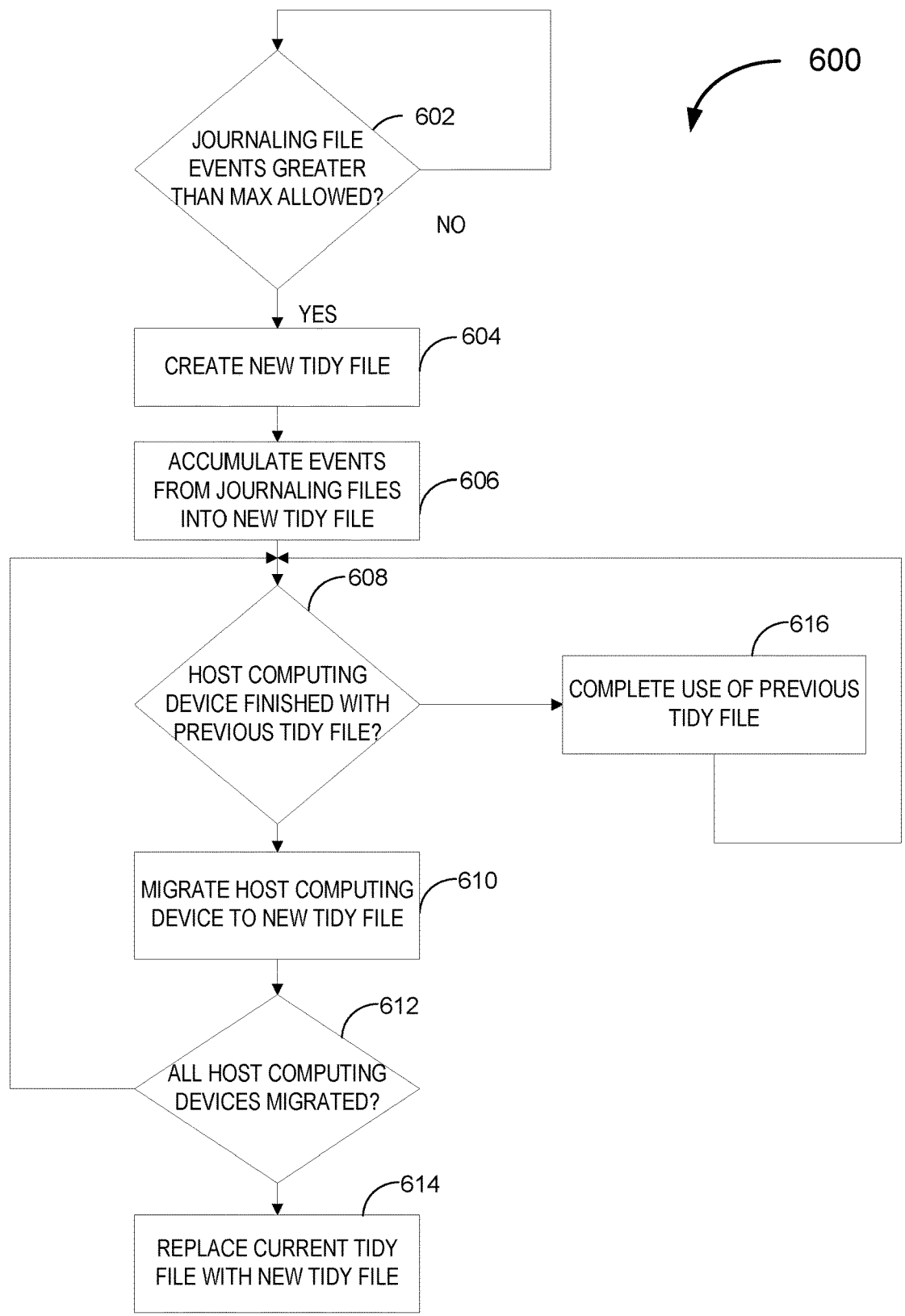
FIG. 6 is a flowchart of an exemplary method performed by the host computing device to migrate or replace the tidy file as the journaling files becomes too large.

FIG. 6 is a flowchart of an exemplary method performed by the host computing device to migrate or replace the current tidy file as the journaling files becomes too large. As storage events accumulate on the journaling files 130, the journaling files 130 becomes larger and larger. In some examples, a policy establishes a maximum or threshold size of a journaling file 130 before creation of a new tidy file 132. Alternatively, the policy dictates the number of events 202 which are permitted to accumulate on the journaling files 130 before a new tidy file 132 is created. Under method 600, once the journaling file 130 reaches or exceeds the threshold size or the number events reaches the max allowed, at 602, a new tidy file 132 is created to accumulate the events 202. At 604, the second or new tidy file 132 is created but is initially empty and the old or current tidy file 132 is still being utilized. In some examples, when the new tidy file 132 is created at 604, and contents of the current tidy file 132 are inserted into the new tidy file 132. At 606, the events 202 on the journaling files 130 are accumulated into the new tidy file 132.

At 608, it is determined whether the host computing devices 106 are still using the current tidy file 132. At 616, host computing devices 106 begin to complete their use of the current tidy file 132. Upon completing their use of the current tidy file 132, host computing devices 106 are migrated to the new tidy file 132 at 610. This cycle continues until all host computing devices 106 are migrated to the new tidy file 132 at 612. Once all the host computing devices 106 have migrated to the new tidy file 132, the current tidy file 132 is replaced by the new tidy file 132 at 614. The tidy file 132 is a static, unchanging file. The tidy file is not updated; instead, a new tidy file 132 is created as needed.

In some examples, the now old (previously current) tidy file 132 is removed, deleted, or discarded. Alternatively, all tidy files 132 are maintained on the storage device, but only the newest tidy file 132 is used. In an example where multiple tidy files 132 are maintained, the "current" tidy file 132 is the tidy file 132 with the most recent PTS.

Figure 7:
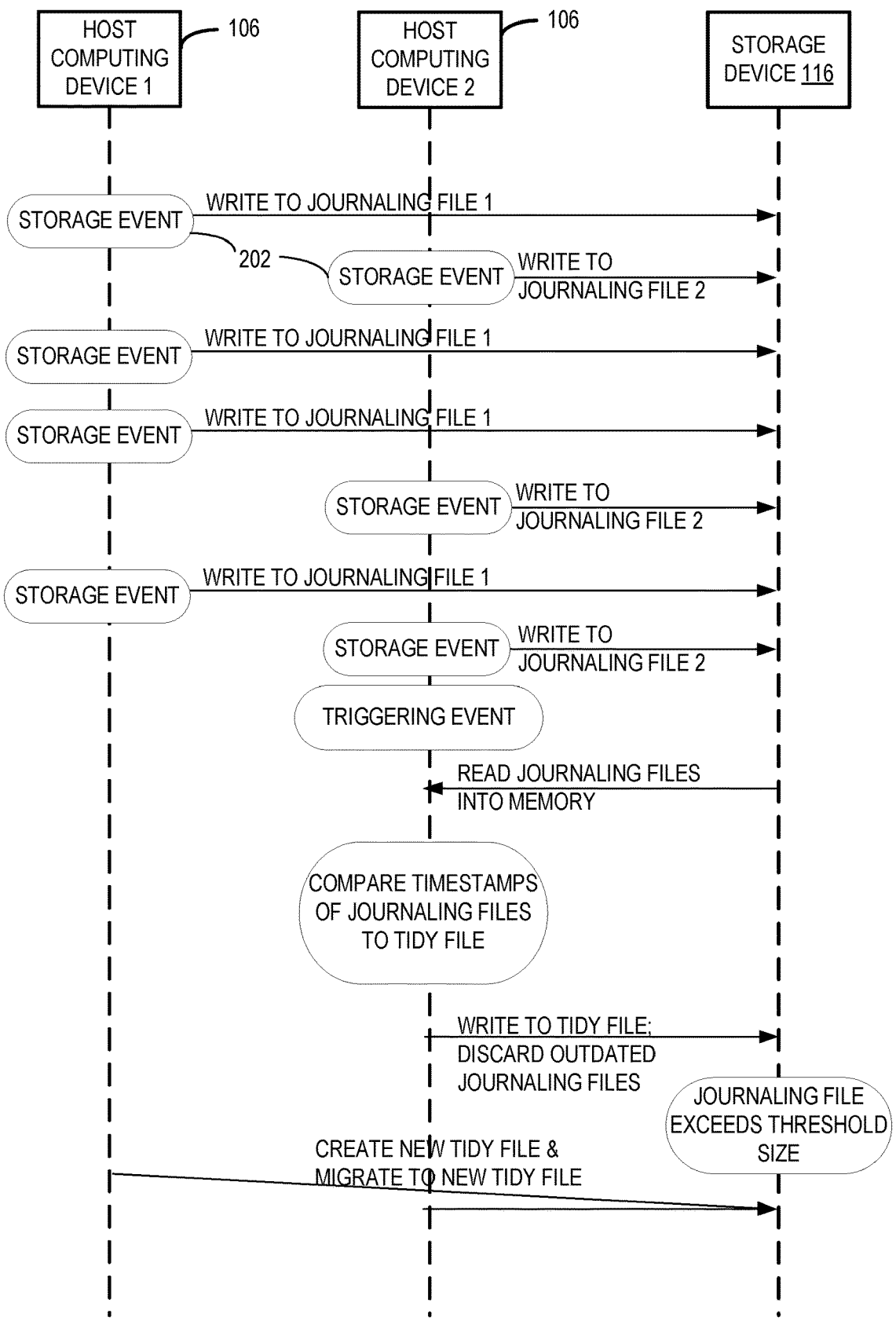
FIG. 7 is a sequence diagram illustrating the interactions between two host computing devices and the storage device during distributed management of the shared inventory.

FIG. 7 is a sequence diagram illustrating the interactions between two host computing devices and the storage device during distributed management of the shared inventory. Host computing devices 1 and 2 106 engage in multiple storage events 202. As each event 202 occurs, the host computing devices 106 write to their associated journaling files 130 on the storage device 116, in accordance with method 400. A triggering event occurs on host computing device 2 106, prompting host computing device 2 106 to read the journaling files 130 of all of the host computing devices 106 into the memory 110 of host computing device 2 106. Host computing device 2 106 compares the PTSs 304 of the events 202 of the journaling files 130 to the PTS 304 of the tidy file 132. The PTS 304 of the tidy file 132, in some examples, represents the point to which the tidy file 132 is updated or current. The tidy file 132 is written with any of the events 202 of the journaling files 130 which have a more recent PTS 304 than the tidy file 132. Any events 202 of a journaling file 130 which has a PTS 304 which is less recent than the PTS 304 of the tidy file 132 is discarded. The PTS 304 of the tidy file 132 is updated. Once the number of events in the journaling files 130 exceeds a threshold size, a new tidy file 132 is created. Upon creation of the new tidy file 132, host computing devices 106 begin migrating to the new tidy file 132. Once the last host computing device 106 finishes with the previous tidy file 132, the previous tidy file 132 is discarded. The new tidy file 132 is used by all host computing devices 106.

FIG. 8 is a block diagram of an example host computing device 106. Host computing device 106 includes a processor 108 for executing instructions. In some examples, executable instructions are stored in a memory 110. Memory 110 is any device allowing information, such as executable instructions and/or other data, to be stored and retrieved. For example, memory 110 may include one or more random access memory (RAM) modules, flash memory modules, hard disks, solid state disks, and/or optical disks.

Host computing device 106 may include a user interface device 810 for receiving data from a user 808 and/or for presenting data to user 808. User 808 may interact indirectly with host computing device 106 via another computing device such as a device running VMware's vCenter Server or other management device. User interface device 810 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 810 operates to receive data from user 808, while another device (e.g., a presentation device) operates to present data to user 808. In other examples, user interface device 810 has a single component, such as a touch screen, that functions to both output data to user 808 and receive data from user 808. In such examples, user interface device 810 operates as a presentation device for presenting information to user 808. In such examples, user interface device 810 represents any component capable of conveying information to user 808. For example, user interface device 810 may include, without limitation, a display device (e.g., a liquid crystal display (LCD), organic light emitting diode (OLED) display, or "electronic ink" display) and/or an audio output device (e.g., a speaker or headphones). In some examples, user interface device 810 includes an output adapter, such as a video adapter and/or an audio adapter. An output adapter is operatively coupled to processor 108 and configured to be operatively coupled to an output device, such as a display device or an audio output device.

Host computing device 106 also includes a network communication interface 812, which enables host computing device 106 to communicate with a remote device (e.g., another computing device) via a communication medium, such as a wired or wireless packet network. For example, host computing device 106 may transmit and/or receive data via network communication interface 812. User interface device 810 and/or network communication interface 812 may be referred to collectively as an input interface and may be configured to receive information from user 808.

Host computing device 106 further includes a storage interface 816 that enables host computing device 106 to communicate with one or more data storage devices, which store virtual disk images, software applications, and/or any other data suitable for use with the methods described herein. In example examples, storage interface 816 couples host computing device 106 to a storage area network (SAN) (e.g., a Fibre Channel network) and/or to a network-attached storage (NAS) system (e.g., via a packet network). The storage interface 816 may be integrated with network communication interface 812.

FIG. 9 depicts a block diagram of virtual machines $935_1$, $935_2$ ... $935_N$ that are instantiated on host computing device 106. Host computing device 106 includes a hardware platform 905, such as an x86 architecture platform. Hardware platform 905 may include processor 108, memory 110, network communication interface 812, user interface device 810, and other input/output (I/O) devices, such as a presentation device. A virtualization software layer, also referred to hereinafter as a hypervisor 910, is installed on top of hardware platform 905.

The virtualization software layer supports a virtual machine execution space 930 within which multiple virtual machines (VMs $935_1$-$935_N$) may be concurrently instantiated and executed. Hypervisor 910 includes a device driver layer 915, and maps physical resources of hardware platform 905 (e.g., processor 108, memory 110, network communication interface 812, and/or user interface device 810) to "virtual" resources of each of VMs $935_1$-$935_N$ such that each of VMs $935_1$-$935_N$ has its own virtual hardware platform (e.g., a corresponding one of virtual hardware platforms $940_1$-$940_N$), each virtual hardware platform having its own emulated hardware (such as a processor 945, a memory 950, a network communication interface 955, a user interface device 960 and other emulated I/O devices in VM $935_1$). Hypervisor 910 may manage (e.g., monitor, initiate, and/or terminate) execution of VMs $935_1$-$935_N$ according to policies associated with hypervisor 910, such as a policy specifying that VMs $935_1$-$935_N$ are to be automatically restarted upon unexpected termination and/or upon initialization of hypervisor 910. In addition, or alternatively, hypervisor 910 may manage execution VMs $935_1$-$935_N$ based on requests received from a device other than host computing device 106. For example, hypervisor 910 may receive an execution instruction specifying the initiation of execution of first VM $935_1$ from a management device via network communication interface 812 and execute the execution instruction to initiate execution of first VM $935_1$.

In some examples, memory 950 in first virtual hardware platform $940_1$ includes a virtual disk that is associated with or "mapped to" one or more virtual disk images stored on a disk (e.g., a hard disk or solid state disk) of host computing device 106. The virtual disk image represents a file system (e.g., a hierarchy of directories and files) used by first VM $935_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 915 includes, for example, a communication interface driver 920 that interacts with network communication interface 812 to receive and transmit data from, for example, a local area network (LAN) connected to host computing device 106. Communication interface driver 920 also includes a virtual bridge 925 that simulates the broadcasting of data packets in a physical network received from one communication interface (e.g., network communication interface 812) to other communication interfaces (e.g., the virtual communication interfaces of VMs $935_1$-$935_N$). Each virtual communication interface for each VM $935_1$-$935_N$, such as network communication interface 955 for first VM $935_1$, may be assigned a unique virtual Media Access Control (MAC) address that enables virtual bridge 925 to simulate the forwarding of incoming data packets from network communication interface 812. In an example, network communication interface 812 is an Ethernet adapter that is configured in "promiscuous mode" such that all Ethernet packets that it receives (rather than just Ethernet packets addressed to its own physical MAC address) are passed to virtual bridge 925, which, in turn, is able to further forward the Ethernet packets to VMs $935_1$-$935_N$. This configuration enables an Ethernet packet that has a virtual MAC address as its destination address to properly reach the VM in host computing device 106 with a virtual communication interface that corresponds to such virtual MAC address.

Virtual hardware platform $940_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 965 in order to execute applications 970 for an instantiated VM, such as first VM $935_1$. Virtual hardware platforms $940_1$-$940_N$ may be considered to be part of virtual machine monitors (VMM) $975_1$-$975_N$ that implement virtual system support to coordinate operations between hypervisor 910 and corresponding VMs $935_1$-$935_N$. Those with ordinary skill in the art will recognize that the various terms, layers, and categorizations used to describe the virtualization components in FIG. 9 may be referred to differently without departing from their functionality or the spirit or scope of the disclosure. For example, virtual hardware platforms $940_1$-$940_N$ may also be considered to be separate from VMMs $975_1$-$975_N$, and VMMs $975_1$-$975_N$ may be considered to be separate from hypervisor 910. One example of hypervisor 910 that may be used in an example of the disclosure is included as a component in VMware's ESX brand software, which is commercially available from VMware, Inc.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or the like in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the disclosure constitute exemplary means for distributed management of an inventory of a shared, virtualized storage device accessed by one or more of a plurality of host computing devices. For example, the components illustrated in FIGS. 1A, 1B, 2, 3, 8, and/or 9, when performing the operations illustrated in FIGS. 4, 5, 6, and/or 7, constitute exemplary means for creating, by one of the plurality of host computing devices, a plurality of journaling files each having timestamps, the plurality of journaling files including records of actions performed on the storage device by the host computing device; exemplary means for comparing the timestamps on the journaling files to a timestamp on a tidy file; and exemplary means for writing, into the tidy file, any of the journaling files that have timestamps that are more recent than the timestamp of the tidy file.

At least a portion of the functionality of the various elements illustrated in the figures may be performed by other elements in the figures, or an entity (e.g., processor, web service, server, application program, computing device, etc.) not shown in the figures.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing examples, VMs are used as an example for the containers and hypervisors as an example for the hardware abstraction layer. Each VM generally includes a guest operating system in which at least one application runs. It should be noted that these examples may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of"

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A computing system for distributed management of an inventory of a plurality of shared storage objects accessed by a plurality of host computing devices over a network, said system comprising:
    a memory area storing a plurality of journaling files each having timestamps, the plurality of journaling files being accessible to the plurality of host computing devices, and being cached from the plurality of shared storage objects; and
    a processor programmed to:
        create the plurality of journaling files, the plurality of journaling files including records of events performed on the plurality of shared storage objects by a host computing device of the plurality of host computing devices;
        compare the timestamps of the events in the plurality of journaling files, to a timestamp of a current tidy file, the current tidy file representing the inventory at a timestamp point of time;
        write to the current tidy file, based on the comparison, any of the plurality of journaling file events, performed by the host computing device, having a timestamp that is more recent than the timestamp of the current tidy file; and
        migrate the host computing device to use the current tidy file to maintain the inventory of the plurality of shared storage objects.

2. The computing system of claim 1, wherein the records of events include actions, performed on the plurality of shared storage objects by the host computing device, and timestamps corresponding to the actions.

3. The computing system of claim 2, wherein the processor is programmed to write to the current tidy file, upon determining that at least one of the timestamps corresponding to the actions is more recent than the timestamp of the current tidy file, by adding the at least one of the timestamps and the corresponding action to the current tidy file.

4. The computing system of claim 1, wherein the tidy file is created upon the plurality of journaling files reaching a threshold value.

5. The computing system of claim 4, wherein the plurality of journaling files reaching a threshold value includes a number of the events recorded in the plurality of journaling files reaching a maximum allowed value.

6. The computing system of claim 1, wherein the current tidy file is a first tidy file, and wherein the processor is further programmed to replace the first tidy file with a second tidy file when the events in the journaling files, upon accumulation, exceed a predefined number.

7. The computing system of claim 6, wherein the processor is further programmed to include the events of the first tidy file in the second tidy file.

8. A method for distributed management of an inventory of a plurality of shared storage objects accessed by one or more of a plurality of host computing devices over a network, said method comprising:

creating, by one of the plurality of host computing devices, a plurality of journaling files each having events with timestamps, the plurality of journaling files including records of events performed on the plurality of shared storage objects by the host computing device;

comparing the timestamps on the events in the journaling files to a timestamp on a first tidy file, the first tidy file representing the inventory at a timestamp point of time; and for any of the journaling files having events, performed by the host computing device, with timestamps that are more recent than the timestamp of the first tidy file, writing those events into the first tidy file; and migrating the host computing device to use the first tidy file to maintain the inventory of the plurality of shared storage objects.

9. The method of claim 8, further comprising reading, from the plurality of shared storage objects, additional timestamped events from journaling files into memory intermittently, regularly, at scheduled intervals, in accordance with a protocol, upon demand, or in response to an event.

10. The method of claim 8, wherein the tidy file is created upon the plurality of journaling files reaching a threshold value.

11. The method of claim 10, wherein the plurality of journaling files reaching a threshold value includes a number of the events recorded in the plurality of journaling files reaching a maximum allowed value.

12. The method of claim 8, further comprising discarding any of the journaling files reaching some predefined size and having events with a timestamp older than the timestamp of a current tidy file.

13. The method of claim 8, wherein creating the plurality of journaling files further comprises recording operations performed by the one of the plurality of host computing devices upon the plurality of shared storage objects.

14. The method of claim 13, wherein the operations comprise at least one of registering, moving, or updating data.

15. A non-transitory computer-readable medium including instructions that, when executed by one or more of a plurality of host computing devices, manage in a distributed manner an inventory of a plurality of shared storage objects, accessed by the plurality of host computing devices over a network, by:

creating, by one of the plurality of host computing devices, a plurality of journaling files each having a plurality of timestamped events, the plurality of journaling files including records of events performed on the plurality of shared storage objects by the host computing device;

comparing the timestamps of the plurality of events on at least one of the journaling files to a timestamp on a current tidy file, the current tidy file representing the inventory at a timestamp point of time;

if a timestamp of the timestamps of at least one of the events is more recent than the timestamp of the current tidy file, writing the at least one of the events into the current tidy file; and migrating the host computing device to use the current tidy file to maintain the inventory of the plurality of shared storage objects.

16. The non-transitory computer-readable medium of claim 15, further including instructions that, when executed, access the current tidy file via an application programming interface (API).

17. The non-transitory computer-readable medium of claim 15, further including instructions that, when executed, cache the timestamped events from the plurality of journaling files.

18. The non-transitory computer-readable medium of claim 15, further including instructions that, when executed, store the current tidy file on the plurality of shared storage objects.

19. The non-transitory computer-readable medium of claim 15, further including instructions that, when executed, determine an association between each of the plurality of journaling files and at least one of the plurality of host computing devices.

20. The non-transitory computer-readable medium of claim 15, further including instructions that, when executed, select as the current tidy file one of a plurality of available tidy files based on timestamps associated with the plurality of available tidy files.

\* \* \* \* \*